United States Patent
Gaebler et al.

(10) Patent No.: US 10,175,059 B2
(45) Date of Patent: Jan. 8, 2019

(54) METHOD, APPARATUS AND COMPUTER PROGRAM PRODUCT FOR A NAVIGATION SYSTEM USER INTERFACE

(71) Applicant: HERE Global B.V., Eindhoven (NL)

(72) Inventors: Frank Gaebler, Berlin (DE); Olivier Dousse, Berlin (DE)

(73) Assignee: HERE Global B.V., Eindhoven (NL)

( * ) Notice: Subject to any disclaimer, the term of this patent is extended or adjusted under 35 U.S.C. 154(b) by 114 days.

(21) Appl. No.: 15/251,105

(22) Filed: Aug. 30, 2016

(65) Prior Publication Data

US 2018/0058870 A1 Mar. 1, 2018

(51) Int. Cl.
| | | |
|---|---|---|
| *G01C 21/34* | (2006.01) | |
| *G01C 21/36* | (2006.01) | |
| *B60W 30/095* | (2012.01) | |
| *G01C 21/26* | (2006.01) | |
| *B60T 7/12* | (2006.01) | |

(Continued)

(52) U.S. Cl.
CPC ..... *G01C 21/3484* (2013.01); *G01C 21/3461* (2013.01); *G01C 21/3492* (2013.01); *G01C 21/3617* (2013.01); *G01C 21/3682* (2013.01); *G01C 21/3691* (2013.01); *G01C 21/3694* (2013.01); *G08G 1/093* (2013.01); *G08G 1/09675* (2013.01); *G08G 1/096733* (2013.01)

(58) Field of Classification Search
CPC .......................... G01C 21/3617; G01C 21/3691
USPC ........................................................ 701/446
See application file for complete search history.

(56) References Cited

U.S. PATENT DOCUMENTS

| | | |
|---|---|---|
| 9,091,561 B1 | 7/2015 | Weir |
| 2010/0010733 A1 | 1/2010 | Krumm |

(Continued)

FOREIGN PATENT DOCUMENTS

| | | |
|---|---|---|
| WO | WO 2007/087928 A1 | 8/2007 |
| WO | WO 2010/040385 A1 | 4/2010 |

(Continued)

OTHER PUBLICATIONS

Extended European Search Report for Application No. EP 17 18 8396 dated Jan. 26, 2018, 10 pages.

(Continued)

*Primary Examiner* — Maceeh Anwari
(74) *Attorney, Agent, or Firm* — Alston & Bird LLP

(57) ABSTRACT

Embodiments described herein may provide a method for identifying geo-tagged objects or events and estimating the probability that a vehicle path will intersect with the geo-tagged object or event. Methods may include: determining a first map-matched location and a second map-matched location; determining a plurality of road segments emanating from or leading to the first map-matched location, a portion of which connect between the first map-matched location and the second map-matched location; calculating at least one of a weight or a turn probability for turning onto a road segment for each road segment of the plurality of road segments; and determining, from the weight or the turn probability associated with each road segment of the portion of road segments that connect between the first map-matched location and the second map-matched location, a probability of a path taken between the first map-matched location and the second map-matched location.

25 Claims, 6 Drawing Sheets

(51) Int. Cl.
*G08G 1/09* (2006.01)
*G08G 1/0967* (2006.01)

(56) References Cited

U.S. PATENT DOCUMENTS

| 2014/0278051 | A1 | 9/2014 | McGavran et al. |
| 2014/0316686 | A1 | 10/2014 | Skupin |
| 2016/0159346 | A1* | 6/2016 | Wilson ................ B60W 30/095 701/36 |

FOREIGN PATENT DOCUMENTS

| WO | WO 2014/170434 A1 | 10/2014 |
| WO | WO-2014/170442 A1 | 10/2014 |

OTHER PUBLICATIONS

Jeung et al. "Path Prediction and Predictive Range Querying in Road Network Databases." The VLDB Journal, published online; URL: <http://www.springerlink.com/content/n2421137r5886p26/> May 19, 2010, 18 pages.

Chen et al. "Discovering Popular Routes From Trajectories." IEEE 27th International Conference on Data Engineering (ICDE), Apr. 11-16, 2011, 12 pages.

* cited by examiner

METHOD, APPARATUS AND COMPUTER PROGRAM PRODUCT FOR A NAVIGATION SYSTEM USER INTERFACE

TECHNOLOGICAL FIELD

An example embodiment of the present invention relates generally to providing navigation assistance, and more particularly, to a method, apparatus and computer program product for identifying geo-tagged objects or events and estimating the probability that a vehicle path will intersect with each geo-tagged object or event.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route, or general assistance to a user when no specific destination has been selected. Further, dynamic map attributes such as route traffic, route conditions, and other dynamic map-related information may be provided to enhance the digital maps and facilitate navigation and driver assistance through situational awareness. Typical digital maps and navigation systems may have copious amounts of information available, from various road network awareness to accident, construction, and other traffic-related dynamically updated data. This data is often unused unless a destination has been selected and route guidance to the destination planned.

BRIEF SUMMARY

A method, apparatus, and computer program product are therefore provided for providing a navigation system user interface including a relevance-ranked list of geo-tagged objects. An apparatus may be provided including at least one processor and at least one non-transitory memory including computer program code instructions. The computer program code instructions may be configured to, when executed, cause the apparatus to at least: determine a first map-matched location and a second map-matched location; determine a plurality of road segments emanating from or leading to the first map-matched location, a portion of which connect between the first map-matched location and the second map-matched location; calculate at least one of a weight or a turn probability for turning onto a road segment for each road segment of the plurality of road segments; and determine, from the weight or the turn probability associated with each road segment of the portion of road segments that connect between the first map-matched location and the second map-matched location, a probability of a path taken between the first map-matched location and the second map-matched location, the path comprising a plurality of road segments.

According to some embodiments, the first map-matched location corresponds to a current location of a vehicle, where causing the apparatus to determine the first map-matched location includes causing the apparatus to determine the first map-matched location and a direction of travel of the vehicle. Causing the apparatus to calculate a weight or a turn probability for turning onto a road segment for each road segment may include causing the apparatus to calculate a weight or a turn probability for each road segment based, at least in part, on the direction of travel. The apparatus of example embodiments may further be caused to: determine a third map-matched location; determine a plurality of road segments between the first map-matched location and the second map-matched location; and calculate a weight or a turn probability for turning onto a road segment for each road segment of the plurality of road segments between the first map-matched location and the third map-matched location, where the weight or turn probability corresponds to an estimated likelihood that the corresponding road segment will be traversed between the first map-matched location and the third map-matched location.

According to some embodiments, the second map-matched location may be associated with a first event while the third map-matched location may be associated with a second event. The apparatus of example embodiments may be caused to: determine a probability that the vehicle will traverse a road segment associated with the second map-matched location; determine a probability that the vehicle will traverse a road segment associated with the third map-matched location; rank the first event and the second event according to the probabilities associated with their respective locations; and provide for presentation of the first event and the second event according to their rank.

Causing the apparatus to calculate a weight or a turn probability for turning onto a road segment for each road segment of the plurality of road segments between the first map-matched location and the second map-matched location may include causing the apparatus to: determine one or more turn probabilities between the first map-matched location and a respective road segment; and calculate a weight for each respective road segment based, at least in part, on the turn probabilities between the first map-matched location and the respective road segment.

Causing the apparatus to calculate a weight or a turn probability for turning onto a road segment for each road segment of the plurality of road segments between the first map-matched location and the second map-matched location may optionally include causing the apparatus to: determine one or more recorded trajectories, where the one or more recorded trajectories includes at least one of the plurality of road segments; and calculate a weight or a turn probability for turning onto a road segment for each road segment of the plurality of road segments between the first map-matched location and the second map-matched location based at least in part on the one or more recorded trajectories.

Embodiments of the present invention may provide a computer program product including at least one non-transitory computer-readable storage medium having computer-executable program code instructions stored therein. The computer-executable program code instructions including program code instructions to: determine a first map-matched location and a second map-matched location; determine a plurality of road segments emanating from or leading to the first map-matched location, a portion of which connect between the first map-matched location and the second map-matched location; calculate at least one of a weight or a turn probability for turning onto a road segment for each of the plurality of road segments; and determine, from the weight or the turn probability associated with each road segment of the portion of road segments that connect between the first map-matched location and the second map-matched location, a probability of a path taken between the first map-matched location and the second map-matched location, the path including a plurality of road segments.

The first map-matched location may correspond to a current location of a vehicle, where the program code instructions to determine the first map-matched location includes program code instructions to determine the first map-matched location and a direction of travel of the vehicle. The program code instructions to calculate a weight or a turn probability for turning onto a road segment for each road segment includes causing the apparatus to calculate a weight or a turn probability for turning onto a road segment for each road segment based, at least in part, on the direction of travel. The computer program product of some embodiments may include program code instructions to: determine a third map-matched location; determine a plurality of road segments between the first map-matched location and the second map-matched location; and calculate a weight or a turn probability for turning onto a road segment for each road segment of the plurality of road segments between the first map matched location and the third map-matched location, where the weight or the turn probability corresponds to an estimated likelihood that the corresponding road segment will be traversed between the first map-matched location and the third map-matched location.

According to some embodiments, the second map-matched location may be associated with a first event, while the third map-matched location may be associated with a second event. The computer program product may include program code instructions to: determine a probability that the vehicle will traverse a road segment associated with the second map-matched location; determine a probability that the vehicle will traverse a road segment associated with the third map-matched location; rank the first event and the second event according to the probabilities associated with their respective locations; and provide for presentation of the first event and the second event according to their rank.

According to some embodiments, the program code instructions to calculate a weight or a turn probability for turning onto a road segment for each road segment of the plurality of road segments between the first map-matched location and the second map-matched location may include program code instructions to: determine one or more turn probabilities between the first map-matched location and a respective road segment; and calculate a weight for each respective road segment based, at least in part, on the turn probabilities between the first map-matched location and the respective road segment.

According to some embodiments, the program code instructions to calculate a weight or a turn probability for turning onto a road segment for each road segment of the plurality of road segments between the first map-matched location and the second map-matched location may include program code instructions to: determine one or more recorded trajectories, where the one or more recorded trajectories includes at least one of the plurality of road segments; and calculate a weight or a turn probability for turning onto a road segment for each road segment of the plurality of road segments between the first map-matched location and the second map-matched location based at least in part on the one or more recorded trajectories.

Embodiments of the present invention may provide a method including: determining a first map-matched location and a second map-matched location; determining a plurality of road segments emanating from or leading to the first map-matched location, a portion of which connect between the first map-matched location and the second map-matched location; calculating at least one of a weight or a turn probability for turning onto a road segment for each road segment of the plurality of road segments; and determining, from the weight or the turn probability associated with each road segment of the portion of road segments that connect between the first map-matched location and the second map-matched location, a probability of a path taken between the first map-matched location and the second map-matched location, the path comprising a plurality of road segments. The first map-matched location may correspond to the current position of a vehicle, where determining the first map-matched location may include determining the first map-matched location and a direction of travel of the vehicle. Calculating a weight for each road segment may include calculating a weight for each road segment based, at least in part, on the direction of travel.

According to some embodiments, methods may include: determining a third map-matched location; determining a plurality of road segments between the first map-matched location and the second map-matched location; and calculating a weight or a turn probability for turning onto a road segment for each road segment of the plurality of road segments between the first map-matched location and the third map-matched location, where the weight or the turn probability for turning onto a road segment corresponds to an estimated likelihood that the corresponding road segment will be traversed between the first map-matched location and the third map-matched location.

The second map-matched location may be associated with a first event while the third map-matched location may be associated with a second event. The method may further include determining a probability that the vehicle will traverse a road segment associated with the second map-matched location; determining a probability that the vehicle will traverse a road segment associated with the third map-matched location; ranking the first event and the second event according to the probabilities associated with their respective locations; and providing for presentation of the first event and the second event according to their rank. Calculating a weight or a turn probability for turning onto a road segment for each road segment of the plurality of road segments between the first map-matched location and the second map-matched location may include: determining one or more turn probabilities between the first map-matched location and a respective road segment; and calculating a weight for each respective road segment based, at least in part, on the turn probabilities between the first map-matched location and the respective road segment.

Embodiments of the present invention may provide a map services provider system. The map services provider system may include a communications interface configured to receive a first location and a second location, and at least one processor. According to some embodiments, the at least one processor may be configured to: map-match the first location to a first map-matched location; map match the second location to a second map-matched location; determine a plurality of road segments emanating from or leading to the first map-matched location, a portion of which connect between the first map-matched location and the second map-matched location; calculate at least one of a weight or a turn probability for turning onto a road segment for each road segment of the plurality of road segments; and determine from the weight or the turn probability associated with each road segment of the portion of road segments that connect between the first map-matched location and the second map-matched location, a probability of a path taken between the first map-matched location and the second map-matched location.

According to some embodiments, the first map-matched location may correspond to a current location of a vehicle, where the processor configured to determine the first map-matched location is further configured to determine the first map-matched location and a direction of travel of the vehicle. The processor configured to calculate a weight or a turn probability for turning onto a road segment for each road segment may further be configured to calculate a weight or a turn probability for each road segment based, at least in part, on the direction of travel. The processor of some embodiments may further be configured to: determine a third map-matched location; determine a plurality of road segments between the first map-matched location and the second map-matched location; and calculate a weight or a turn probability for turning onto a road segment for each road segment of the plurality of road segments between the first map-matched location and the third map-matched location. The weight or turn probability may correspond to an estimated likelihood that the corresponding road segment will be traversed between the first map-matched location and the third map-matched location.

The second map-matched location may be associated with a first event, while the third map-matched location may be associated with a second event. The processor may further be configured to: determine a probability that the vehicle will traverse a road segment associated with the second map-matched location; determine a probability that the vehicle will traverse a road segment associated with the third map-matched location; rank the first event and the second event according to the probabilities associated with their respective locations; and provide for presentation of the first event and the second event according to their rank.

According to some embodiments, the processor configured to calculate a weight or a turn probability for turning onto a road segment for each road segment of the plurality of road segments between the first map-matched location and the second map-matched location may further be configured to: determine one or more turn probabilities between the first map-matched location and a respective road segment; and calculate a weight for each respective road segment based, at least in part, on the turn probabilities between the first map-matched location and the respective road segment. The processor configured to calculate a weight or a turn probability for turning onto a road segment for each road segment of the plurality of road segments between the first map-matched location and the second map-matched location may further be configured to: determine one or more recorded trajectories, where the one or more recorded trajectories includes at least one of the plurality of road segments; and calculate a weight or a turn probability for turning onto a road segment for each road segment of the plurality of road segments between the first map-matched location and the second map-matched location based at least in part on the one or more recorded trajectories.

BRIEF DESCRIPTION OF THE DRAWINGS

Figure 1:
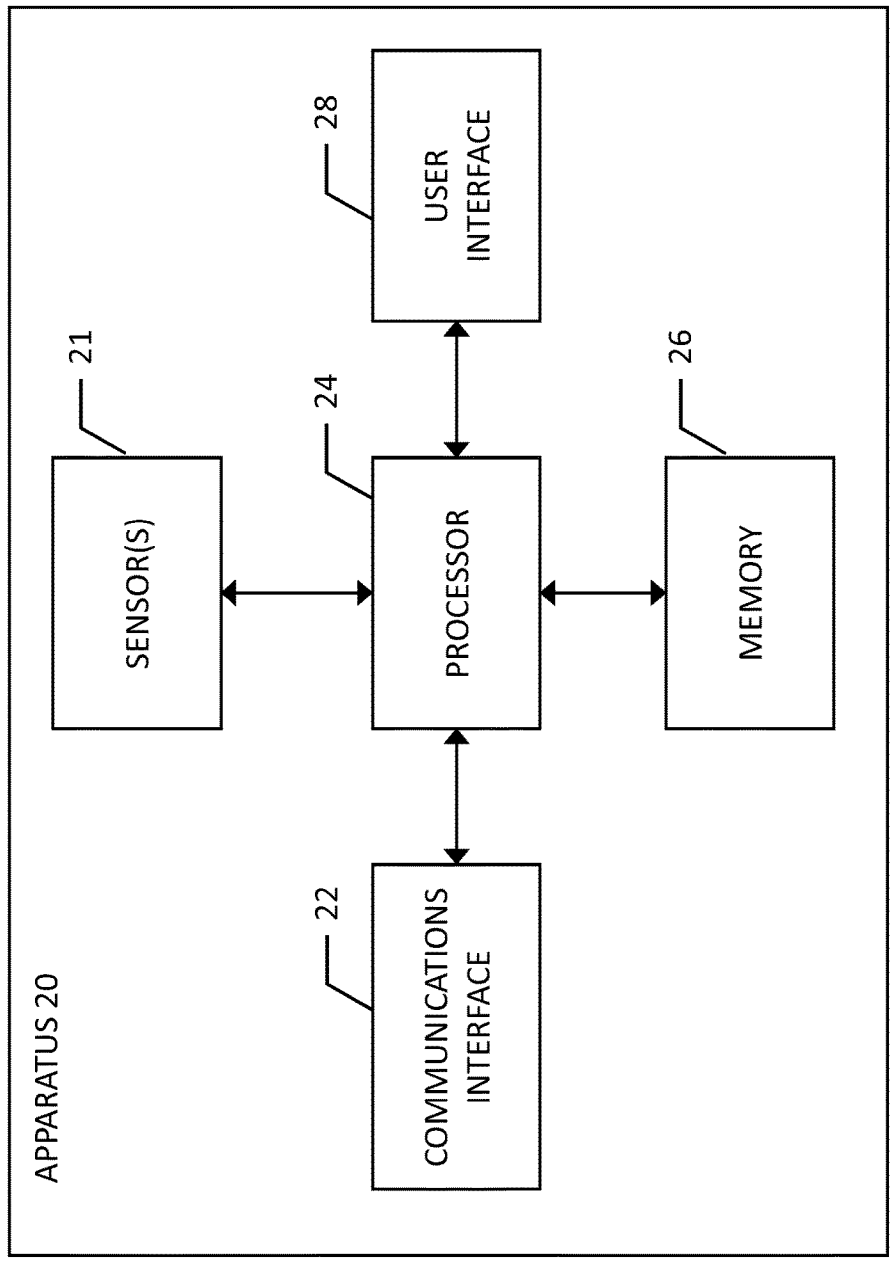
Figure 2:
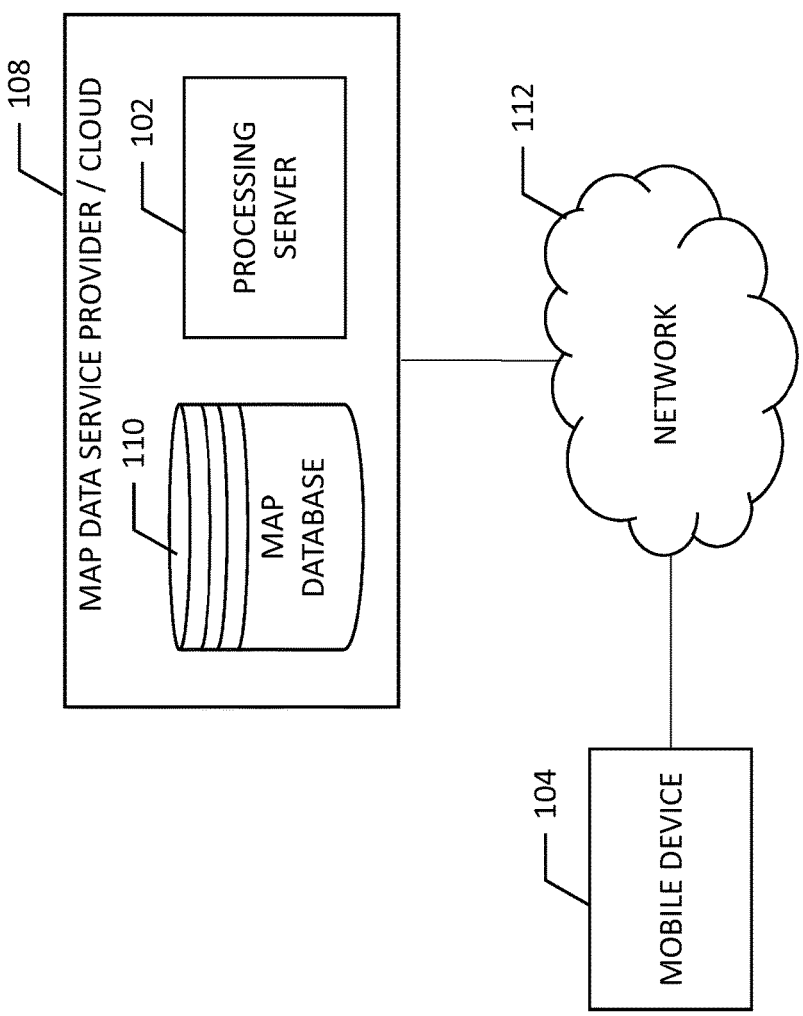
Figure 3:
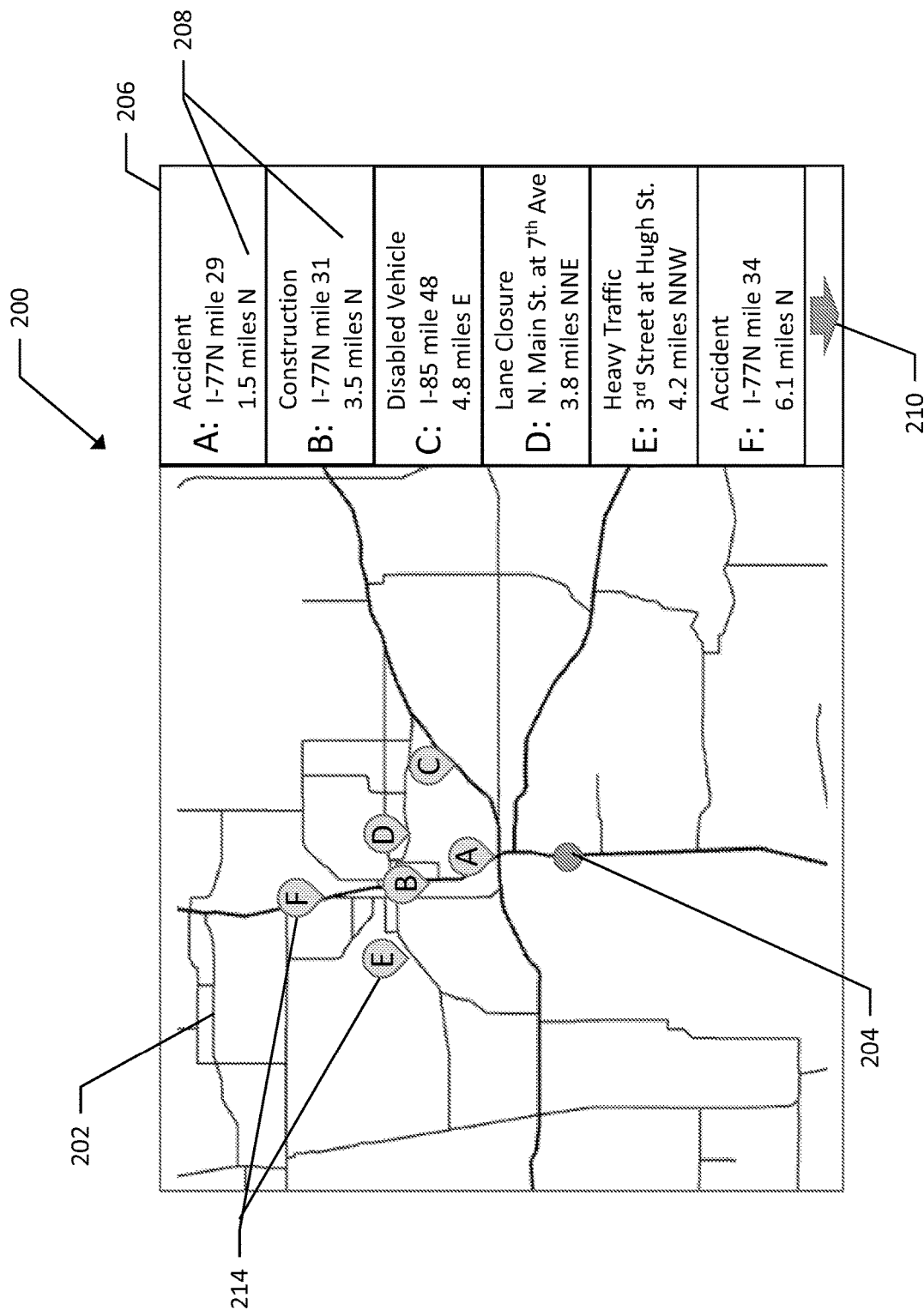
Figure 4:
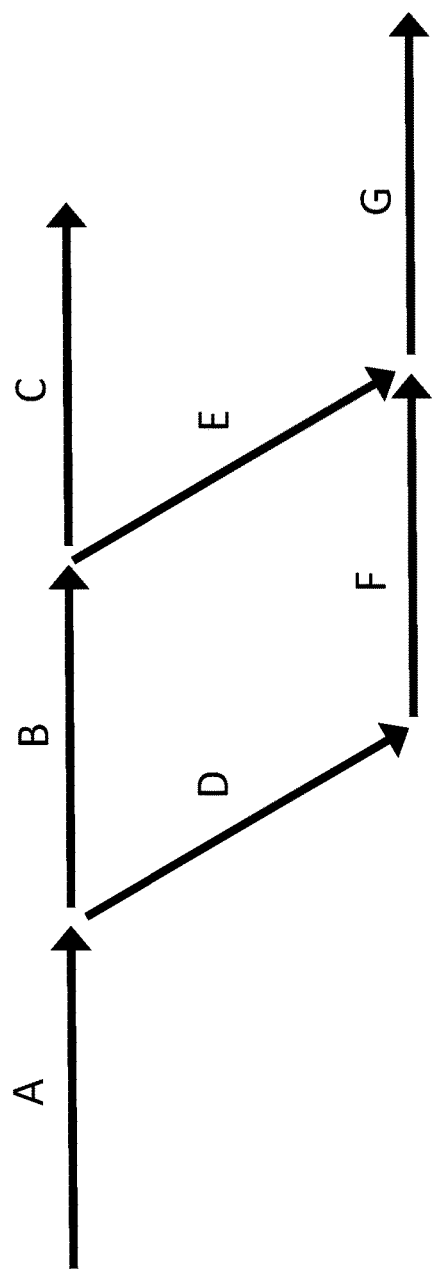
Figure 5:
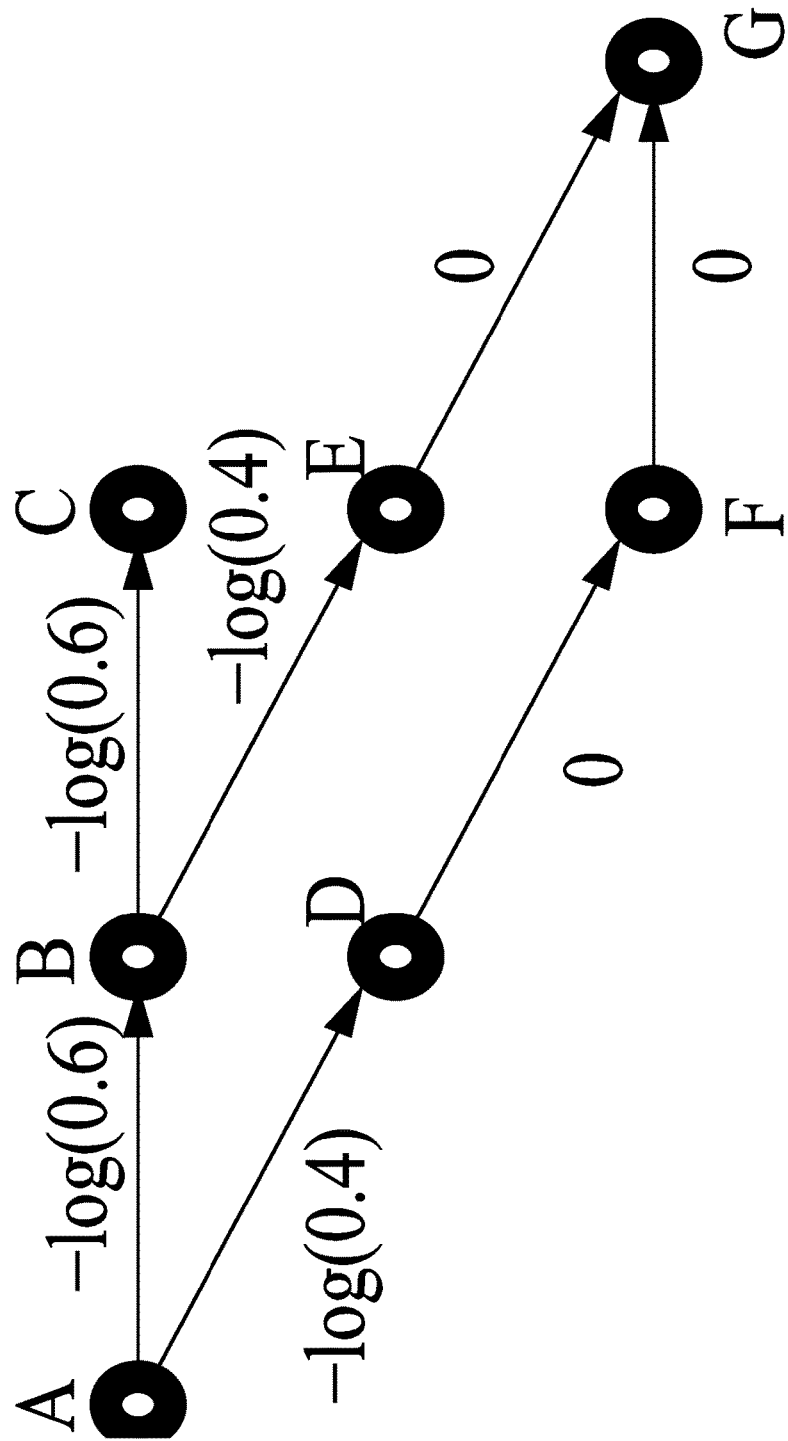
Figure 6:
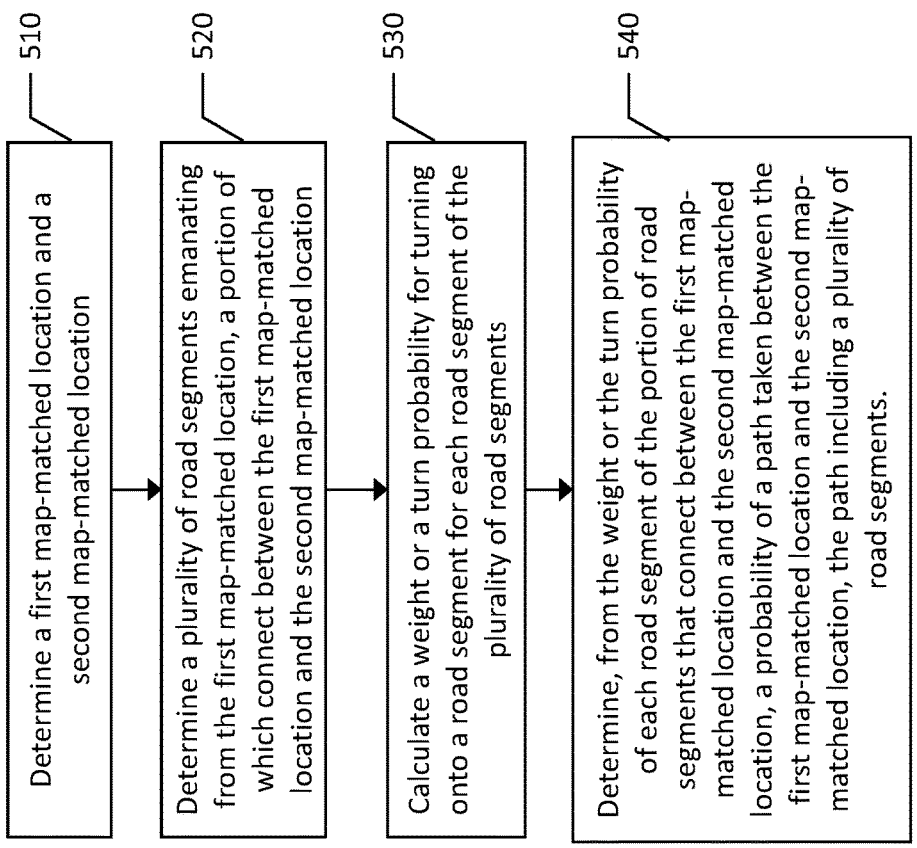

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system for driver assistance on a navigation system according to an example embodiment of the present invention;

FIG. 3 is an example user interface for a navigation system including a relevancy ranked list of geo-tagged events according to an example embodiment of the present invention;

FIG. 4 is an example embodiment of a dual routing graph according to an example embodiment of the present invention;

FIG. 5 is another example of a dual routing graph according to an example embodiment of the present invention; and FIG. 6 is a flowchart of a method for determining a probability or likelihood associated with a path between a first map-matched location and a second map-matched location according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing a navigation system user interface to provide driver assistance in an instance in which no destination has been selected in the navigation system and driver assistance is provided. In this regard, a user interface of a device, such a mobile device or a device affixed to a vehicle, such as to a dashboard or the like, may provide driver assistance to a user. The display of such a navigation system may provide information to a driver about their current location along a roadway, traffic information on the roadways proximate a vehicle, and one or more geo-tagged events that the driver may encounter depending upon the route that they travel. As there may be many geo-tagged events proximate a user, particularly in a dense, urban environment, the geo-tagged events may be ranked according to a likelihood that the driver of the vehicle will encounter these events by traveling a road segment along which the events are occurring or have occurred. Embodiments described herein provide a method of determining the likelihood that the driver of a vehicle will encounter a geo-tagged event, and can provide the driver with a ranked, prioritized listing of these events according to the likelihood that the driver will encounter them.

As described herein, example embodiments of the claims may provide for a user interface with a navigation system. While the term "navigation system" is used herein to describe a device used to present map data, traffic data, etc., it is to be appreciated that such a navigation system can be used via a user interface without providing route guidance information. Route guidance is provided in response to a user entering a desired destination, and where a route between the origin or current location of a user and the destination is mapped and provided to the user. Conversely, as described herein, a navigation system may be used in the absence of a discrete destination to provide driver assistance and information. Example embodiments described herein may provide a navigation system user interface where a portion of the user interface is used to present a list of relevant events to a user, where those events are geo-tagged events that are map-matched to locations along road segments. A listing of events may be prioritized by a probability that the user will encounter the events by traveling along a map-matched road segment associated with the event based on a calculated likelihood of the user traversing the respective road segment. The listing may optionally provide information about the event, such as an event type (e.g., traffic accident, disabled vehicle, road closure, construction, etc.), a location (e.g., the map-matched road segment), the time of the event, an estimated time of arrival at the event if the user proceeds in that direction, or any other information relating to the event that may be available. Embodiments described herein provide for ranking these events according to a probability or likelihood that the user will encounter them, along with selecting a subset of events when the number of events proximate a user exceeds a predetermined amount, such as a maximum number of events to be displayed on the navigation system user interface.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a navigation system user interface may be provided to provide driver assistance to a user traveling along a network of roadways. Navigation systems may receive an indication of a current location of the user, and one or more geo-tagged events that a user may encounter as they traverse a network of road segments. Each of the geo-tagged events may be map-matched to a corresponding road segment, and a calculation may be made for each road segment that represents the likelihood or probability that a user will traverse the respective road segments. A higher probability may suggest that a user is likely to traverse a road segment, and an event associated with that road segment may be given a higher ranking in a list of events presented to a user. Further, as there may be many events, the probability of a user traversing a road segment associated with each event may be used to determine whether the event should be part of a subset of events that the user is made aware of. An event associated with a road segment having a low likelihood that the user will traverse the segment may not merit consideration by the user, such that it may not be presented to a user.

A map service provider database may be used to provide driver assistance via a navigation system. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

Example embodiments provided herein provide a method of presenting useful information to a driver through a navigation system when a distinct destination is not established at the navigation system. For example, a user may be driving home from work, a drive that they perform routinely, such that route guidance assistance may not be needed. However, information regarding events along potential routes may be informative to the user as they self-navigate their route home.

According to the illustrated embodiment of FIG. 3, a user interface may be provided for display on display 200. The user interface may include a depiction of a map 202 of a region or portion thereof. The map 202 may include an indication 204 of a current location on the map or a "map-matched" location where the determined position of the user is correlated or "matched" with a road segment among a network of road segments. The map may scroll to maintain the indication of the current location proximate the center of the displayed map region. The illustrated embodiment further includes a listing of events 206 disposed on the right side of the display 200. While this listing is illustrated along an edge of the display, embodiments may include a list that is presented along any other edge, such as the bottom, top, or right, or disposed away from an edge, while not detracting from other information that may be provided for display, such as the map 202. While the illustrated embodiment depicts a map 202 displayed adjacent to the list of events, other information may similarly be presented, such as a street-view image, zoomed-in view of a particular event, or other information. Further, in example embodiments in which the display 200 is part of an in-vehicle entertainment system or a multi-functional user interface (e.g., for music, phone interaction, vehicle information, etc.), the map 202 may be replaced, overlaid, or supplemented with other displayed information.

As shown, the list of events 206 includes a list of various types of events which are anomalies relative to the norm. Specifically, the events of FIG. 3 include accidents, construction, lane closures, inclement/severe weather, etc., that may impact vehicle traffic along their respective road segments. The listed events are geo-tagged and map-matched, meaning that the events have a defined location, and that defined location is matched to a road segment of a network of roads in a map, such as a network of road segments stored in map database 110. The depicted events 208 listed A-F include information regarding the event, such as event type, map-matched location, distance, and direction. The information presented regarding a listed event may include more or less information regarding the event, and the depicted elements of information presented in FIG. 3 are merely examples of such types of information that may be presented. In the illustrated embodiment, the location is presented as a road segment, such as event A, which has occurred along Interstate 77 (I-77) northbound, proximate mile marker 29. The lane closure of event D is identified by an intersection that identifies the location of the lane closure. An indication of the direction of travel lanes affected by the lane closure may not be necessary, as the driver of the vehicle may be likely to only travel in a single direction on a given road segment based on their current position. For instance, if the disabled vehicle of event C was in the westbound lanes of I-85, the event may not be relevant to a user as from their current position and direction of travel, they may only reasonably travel in the eastbound lanes of I-85. The determination of such event relevance will be described further below with regard to the probability of a driver encountering each event.

As shown, the map 202 may include the current location 204 of the vehicle along a road segment, and the events may be depicted by identifiers 214. These identifiers may include indicators that correspond to events listed in list 206. The indicators 214 may be optional, and the location information displayed in the list 206 may also be optional, particularly when indicators corresponding to the locations of the events are depicted on the map, which may negate the need for a location descriptor in the list 206.

In a densely populated area, or region with a high volume of traffic, there may be many events proximate a user. Limiting events by a distance from the user, such as within two miles, may produce a large number of events, including too many to distinctly present on a user interface through a list (such as list 206) or indicators (such as indicators 214). Further, many events may be irrelevant to a user as they are highly unlikely to encounter them. According to example embodiments provided herein, a method, apparatus, and computer program product are provided that analyze events in order to determine which events are most relevant to a user, and to select only those events, or a subset of those events to a user in a manner that is easily understood and quickly discernable from a user interface.

As noted above, events may be selected from a plurality of events based on an analysis of the event and its location. Provided herein is a probabilistic solution that estimates the probability that a user or driver of a vehicle will drive toward an event, where the selection of relevant events can be those that are above a predefined probability threshold or a predefined number of the most relevant events. The solution provided may involve a combination of a user's historical trajectory data and map data to compute probabilities that the user will traverse road segments, which enables the solution to be implemented for both routine and non-routine trips. Further, example embodiments may include a server-based pre-calculation scheme which enables computationally intensive calculations to be performed on a server, such that the solution can work on a thin client at the user device without sacrificing performance.

In order to create a more meaningful list of events that are estimated to be most relevant to a user or driver of a vehicle, probabilities are calculated for each event as to how likely the user is to traverse a road segment associated with the event. The probability may include two key factors: turn probabilities and recorded trajectories. Generally, turn probabilities are the likelihood of a user or driver of a vehicle to select a particular road segment when presented with an option for two or more road segments emanating from a current location of the vehicle. Recorded trajectories are historical routes taken by a user during prior trips.

With regard to turn probabilities, at each intersection, a driver needs to make a choice. A probability can be assigned to each option. While referred to herein as "turn" probabilities, at an intersection, an option may also include maintaining a straight course through the intersection. While no "turn" may be made, continuing straight is also assigned a probability, generally called a "turn probability". Turn probabilities are calculated on a number of different factors, including features of the road segments such as: road class, angle between incoming and outgoing road segments, traffic volumes, etc. The turn probabilities can be used to determine the probability of a vehicle to follow a particular path, such as by using the product of the turn probabilities at each intersection along the path. The logarithm of this probability is equal to the sum of the logarithm of each turn probability.

According to embodiments of the present invention, the goal is to estimate the probability that a user will encounter a specific event on a specific road segment as illustrated in FIG. 4. To do so, the probability to encounter that event at the event location will be the maximum of the probabilities of all the paths leading from or emanating from the current location that are between the current location and the event location. Estimating this maximum is akin to finding the shortest path on a dual routing graph of FIG. 4, where the edges are weighted according to minus the logarithm of the turn probabilities. Therefore, the probabilities can be computed, such as using Dijkstra's algorithm. An event at a specific location is assigned a probability based on the computed probability.

Referring again to FIG. 4, the arrows A through G each represent road segments in a road network. A vehicle traveling along road segment A has two options for turning when approaching the end of segment A: segment B or segment D. Subsequently, the vehicle has two options if segment B was chosen: segment E or segment C. Alternatively, if segment D was chosen, the vehicle has no options between D and F, such that the turn probability from segment D to F is 100%. The available paths of FIG. 4 include ABC, ADFG, and ABEG. The turn probabilities for D→F, E→G, and F→G are each 1 since there are no alternatives between these segments. However, the remaining segment transitions include turn options, and thus have turn probabilities calculated according to road features.

If an event has occurred along road segment G, a calculation may be made to estimate the probability that a user or driver of a vehicle will traverse road segment G. In the instant example, we assume the following turn probabilities: A→B=0.6; A→D=0.4; B→C=0.6, and B→E=0.4. Using these probabilities, the probability to traverse road segment G from A through ABEG is 0.24 (A→B*B→E*E→G or 0.6*0.4*1.0), and through ADFG is 0.4 (A→D*D→F*F→G or 0.4*1.0*1.0). The probability to traverse road segment G from road segment A is the maximum of the two possible paths, or 0.4. This probability of traversing each road segment can also be mapped according to the illustration of FIG. 5, where a shortest path problem is mapped by assigning minus the log probabilities as weights for the edges of the dual graph. According to the illustration of FIG. 5, the shortest path from A to G is ADFG, and the corresponding weight is −log(0.4). The series of road segments chosen by a driver constitutes the "path" taken by the driver, such that the probabilities discussed herein reflect the probability that a particular turn choice or road segment will lie along the path chosen by the driver.

While turn probabilities can provide an estimated likelihood that a user will traverse a particular road segment, enhancing this estimation using recorded trajectories may provide a more accurate reflection of the likelihood of a user traversing a particular road segment. Navigation systems may record previously driven trajectories, which may include all previously driven trajectories, or trajectories driven over a certain length of time preceding the present. These recorded trajectories each include a plurality of road segments traversed in succession that form tracks.

Based on a current location of a user or driver of a vehicle, all tracks that contain the road segment map-matched to the current location and oriented in the current travel direction may be collected. For all events that occur along a track of a historical trajectory, the probability of traversing the road segment associated with the event may be increased by a factor. According to the example of FIGS. 4 and 5, and using a factor of 1.0 by which a road segment probability may be increased if it corresponds to a historical trajectory, if the user has two recorded tracks that include the sequence of ABEG, and no other recorded track contains A, then the score of B, E, and G, is increased by 2.0. Thus, the score of each road element becomes:

B: 0.6+2.0=2.6

C: 0.36+0=0.36

D: 0.4+0=0.4

E: 0.24+2.0=2.24

F: 0.4+0=0.4

G: 0.4+2.0=2.4

Hence, if there is an event on road segment D, and another event on road segment G, then the one on road segment G will have a higher priority since there is a greater likelihood that a user will traverse road segment G. While a particular unit is assigned to increase the probability of a user taking a particular road segment or turn, the unit or weight assigned based on the historical trajectory may be greater or smaller, depending upon how much weight historical trajectories are to carry with respect to the overall probabilities of a user traversing a particular road segment.

The calculation of a probability that a user will traverse a road segment associated with an event may be computationally intensive, as it may involve the shortest path calculation to every road segment nearby or leading to the event location. This computationally intensive aspect may be mitigated through pre-computation of the probabilities at a server, while the user device benefits from the server-side computation without degraded performance of the process at the device. The method described above can be conducted based on road segments leading to an event from a vehicle location starting from the event instead of starting from the vehicle. The shortest path problem is substantially symmetric with respect to the inversion of the start point and end point, resulting in the vehicle being a first location and the event being a second location, and the probability calculation being performed using turn probabilities in either direction—from the first location to the second location, or to the second location from the first location. Thus, for each map-matched event, the server can pre-compute the probability to reach the road segment associated with the map-matched event from all road segments nearby (e.g., all road segments leading to the map-matched event). These pre-calculated values can then be sent together with the event information to a user device. The user device, such as the navigation system of a vehicle, can then apply locally the scores based on recorded tracks from historical trajectories onto the turn-probability based probabilities of the road segments and produce the historically-weighted probability that the road segment associated with the event will be traversed.

While the determination of a probability is described generally herein as substantially symmetric or reversible, the symmetry stems from the ability to determine turn probabilities or road segment weights for some or all road segments leading to the event being pre-calculated, such as at a server, while turn probabilities or road segment weights emanating from a vehicle location may be calculated, for example, at a user device such as a navigation system. In this manner, the probability of the path of a vehicle encountering an event from the current location of the vehicle may be determined based on road segments and turn probabilities leading to the event, based on road segments and turn probabilities emanating from the vehicle location, or a combination thereof. In an embodiment in which such a combination is used, a plurality of road segment weights and/or turn probabilities emanating from a vehicle location may be determined, and a plurality of road segment weights and/or turn probabilities leading to an event may be determined, and the probabilities for the vehicle paths between the vehicle location and the event may be established based on where the road segments leading to the event intersect or overlap with road segments emanating from the vehicle location.

The events described herein may be relatively static, having a lifetime of minutes or hours, compared to vehicle positions where a road segment may change every few seconds. Thus, the pre-computation could be used on the client-side as a means to reduce the computational intensity of the probability calculation. Using again the example embodiment of FIGS. 4 and 5, if an event is reported on road segment G, the server may use the dual graph of FIG. 5 and compute the distance from G to every node. The distance of the event to each node would be as follows: A: −log(0.4); B: −log(0.4); C:infinity (C is not reachable on a path to G); D: 0; E: 0; and F:0.

The aforementioned methods may calculate a likelihood that a user or driver of a vehicle will traverse a road segment associated with an event. This likelihood or probability may be used to establish: A) whether an event is relevant enough for the user to be notified of the event; and B) a ranking of the events that are relevant enough for the user to be notified of the event. In order for an event to rise to the level of meriting a notification to a user, the likelihood of that user to traverse the road segment associated with the event may be required to meet a predefined threshold of probability. For example, an event along a road segment where there is a one percent chance that the user will traverse the segment may be considered irrelevant and no notification would be provided to the user. However, this threshold may be dynamic rather than static, as one threshold may not always be sufficient. For example, if there is approximately a 15-25% chance that a user will traverse each of five different road segments having events, each of those events may be provided in notifications to a user. In other circumstances, an event along a road segment having a 15% probability of traversal may not warrant a notification, particularly when two other road segments have probabilities of over 40%, for example.

The use of a probability threshold may result in the number of events presented to a user fluctuating during a trip, with some events dropping from a list when their probability drops below the threshold, while others may be added to the list when their probabilities rise above a threshold. The threshold to add events may be different than the threshold to drop events to provide a degree of hysteresis in the list of events and to avoid events rapidly being added and dropped based on a minor probability fluctuation.

Optionally, instead of a threshold relevance or in addition to a threshold relevance, the number of events presented in a list, such as list 206, may be considered when determining which events to present to a user. For example, a list of events may include a number of events that is set according to user preferences, and the list of events may be limited to a predefined number. Thus, if there are six events, each with a probability that would merit notification, while the event list is capped at five events, the event with the lowest ranking may be omitted from the list.

The probability of a user traversing the road segment associated with an event may be dynamic and change periodically, such as when a user's current location changes from one road segment to another. The probability may be re-established at each change in location of a user, or may be performed periodically, such as every 10 to 30 seconds. Optionally, the probability may be re-established dynamically, based on a speed of travel of the vehicle. A vehicle traveling slowly or stuck in traffic, may not require the probability to be re-established frequently, while a fast-moving vehicle may require such frequent updates to the probability.

While the probability of a user traversing a road link associated with an event may be used to determine the priority of events in a list of events, such as list 206 of FIG. 3, additional factors may be considered. For example, a severity of the event may be considered in the calculation of the priority of the event for purposes of displaying ranked events. For example, if an event is a disabled vehicle that is out of the travel lanes of a highway and causing little to no resultant traffic issues, the severity may be low. Conversely, if an accident has closed down all lanes of a highway, the severity may be high. Thus, if the accident that has shut down all lanes of the highway is along a road segment with a lower probability than the disabled vehicle, the accident event may still rank higher in the priorities as the severity is substantially greater, and may impact a decision of the user or driver of the vehicle more substantially than the disabled vehicle event.

Optionally, the distance of an event from a current location of a vehicle may influence the ranking. An event that is far away, but has a high likelihood of the user traversing the associated road segment may be ranked above an event that is close, but has a lower likelihood of the user traversing the associated road segment. Further, while historical tracks of a user may influence the probability that a user may traverse a particular road segment, the preferences of a user may be considered when determining the likelihood that a user will traverse a road segment. For example, if a user has a fondness for a particular restaurant chain, the probability of a user traversing a link proximate a location of that restaurant chain may receive a higher likelihood despite the user never having visited that particular location.

The probability calculation may determine a likelihood that a user will traverse a road segment associated with an event; however, the ranking of the event may influence the priority of the events and ranking thereof, particularly when presenting a list of events to a user. Further, the ranking of events may determine which events are presented to a user on a list, such as the list 206 of FIG. 3.

FIG. 6 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method for identifying geo-tagged objects or events and estimating the probability that a vehicle path will intersect with each geo-tagged object or event while providing an indication of the event(s) through a navigation system user interface identifying the probability or a ranking associated with the probability. As shown at 510, a first map-matched location and a second map-matched location are determined. One of the first map-matched location and the second map-matched location may correspond to a vehicle, while the other corresponds to a geo-tagged event. A plurality of road segments emanating from or leading to the first map-matched location may be determined at 520. The plurality of road segments may be determined from the vehicle location, such as at a user device associated with the vehicle, where the road segments determined may factor in a direction of travel of the vehicle. Optionally, the plurality of road segments may be determined by a server from the map-matched location of the event. Such server-side pre-computation may reduce the processing capacity required by the user device. A portion of the plurality of road segments may connect between the first map-matched location and the second map-matched location. A weight or a turn probability for turning onto a road segment for each road segment of the plurality of road segments may be calculated at 530. From the weight or the turn probability of each road segment of the portion of road segments that connect between the first map-matched location and the second map-matched location, a probability of a particular path taken between the first map-matched location and the second map-matched location may be determined at 540. The path being a series of connected road segments between the first location and the second location.

In an example embodiment, an apparatus for performing the method of FIG. 6 above may comprise a processor (e.g., the processor 24) configured to perform some or each of the operations (510-540) described above. The processor may, for example, be configured to perform the operations (510-540) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-540 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   determine a first map-matched location, wherein the first map matched location corresponds to a current location of a vehicle;
   determine plurality of additional map-matched locations wherein a subset of the plurality of additional map matched locations are each associated with a geo-tagged event;
   determine a plurality of road segments emanating from or leading to the first map-matched location, a portion of which connect between the first map-matched location and the plurality of additional map-matched locations;
   calculate at least one of a weight or a turn probability for turning onto a road segment for each road segment of the plurality of road segments emanating from or leading to the first map-matched location, a portion of which connect between the first map-matched location and the plurality of additional map-matched locations;
   determine, from the weight or the turn probability associated with each road segment of the portion of road segments that connect between the first map-matched location and the plurality of additional map-matched locations, a probability of a path taken between the first map-matched location and each of the geo-tagged events, the path comprising a plurality of road segments;
   generate a list of the geo-tagged events prioritized according to a probability associated with the path to reach each of the respective geo-tagged events; and
   provide for presentation of the prioritized list of geo-tagged events.

2. The apparatus of claim 1, wherein causing the apparatus to determine the first map-matched location comprises causing the apparatus to determine the first map-matched location and a direction of travel of the vehicle.

3. The apparatus of claim 2, wherein causing the apparatus to calculate a weight or a turn probability for turning onto a road segment for each road segment comprises causing the apparatus to calculate a weight or a turn probability for each road segment based, at least in part, on the direction of travel.

4. The apparatus of claim 1, wherein causing the apparatus to calculate a weight or a turn probability for turning onto a road segment for each road segment of the plurality of road segments emanating from or leading to the first map-matched location comprises causing the apparatus to:
  determine one or more turn probabilities between the first map-matched location and a respective road segment; and
  calculate a weight for each respective road segment based, at least in part, on the turn probabilities between the first map-matched location and the respective road segment.

5. The apparatus of claim 4, wherein causing the apparatus to calculate a weight or a turn probability for turning onto a road segment for each road segment of the plurality of road segments emanating from or leading to the first map-matched location further comprises causing the apparatus to:
  determine one or more recorded trajectories, wherein the one or more recorded trajectories comprises at least one of the plurality of road segments; and
  calculate a weight or a turn probability for turning onto a road segment for each road segment of the plurality of road segments emanating from or leading to the first map-matched location based at least in part on the one or more recorded trajectories.

6. The apparatus of claim 1, wherein each geo-tagged event comprises an event type and an event location, and wherein the event type comprises at least one of a: traffic accident, disabled vehicle, road closure, or construction.

7. The apparatus of claim 1, wherein causing the apparatus to provide for presentation of the prioritized list of geo-tagged events comprises causing the apparatus to provide for presentation of the prioritized list of geo-tagged events proximate a map, and wherein a location of each the geo-tagged events of the prioritized list of geo-tagged events is identified on the map.

8. A computer program product comprising at least one non-transitory computer-readable storage medium having computer-executable program code instructions stored therein, the computer-executable program code instructions comprising program code instructions to:
  determine a first map-matched location, wherein the first map matched location corresponds to a current location of a vehicle;
  determine a plurality of additional map-matched locations wherein a subset of the plurality of additional map matched locations are each associated with a geo-tagged event;
  determine a plurality of road segments emanating from or leading to the first map-matched location, a portion of which connect between the first map-matched location and the plurality of additional map-matched locations;
  calculate at least one of a weight or a turn probability for turning onto a road segment for each road segment of the plurality of road segments emanating from or leading to the first map-matched location, a portion of which connect between the first map-matched location and the additional map-matched locations;
  determine, from the weight or the turn probability associated with each road segment of the portion of road segments that connect between the first map-matched location and the plurality of additional map-matched locations, a probability of a path taken between the first map-matched location and each of the geo-tagged events, the path comprising a plurality of road segments;
  generate a list of the geo-tagged events prioritized according to a probability associated with the path to reach each of the respective geo-tagged events; and
  provide for presentation of the prioritized list of geo-tagged events.

9. The computer program product of claim 8, wherein the program code instructions to determine the first map-matched location comprise program code instructions to determine the first map-matched location and a direction of travel of the vehicle.

10. The computer program product of claim 9, wherein the program code instructions to calculate a weight or a turn probability for turning onto a road segment for each road segment comprises causing the apparatus to calculate a weight or a turn probability for turning onto a road segment for each road segment based, at least in part, on the direction of travel.

11. The computer program product of claim 8, wherein the program code instructions to calculate a weight or a turn probability for turning onto a road segment for each road segment of the plurality of road segments emanating from or leading to the first map-matched location comprise program code instructions to:
  determine one or more turn probabilities between the first map-matched location and a respective road segment; and
  calculate a weight for each respective road segment based, at least in part, on the turn probabilities between the first map-matched location and the respective road segment.

12. The computer program product of claim 11, wherein the program code instructions to calculate a weight or a turn probability for turning onto a road segment for each road segment of the plurality of road segments emanating from or leading to the first map-matched location further comprise program code instructions to:
  determine one or more recorded trajectories, wherein the one or more recorded trajectories comprises at least one of the plurality of road segments; and
  calculate a weight or a turn probability for turning onto a road segment for each road segment of the plurality of road segments emanating from or leading to the first map-matched location based at least in part on the one or more recorded trajectories.

13. The computer program product of claim 8, wherein each geo-tagged event comprises an event type and an event location, and wherein the event type comprises at least one of a: traffic accident, disabled vehicle, road closure, or construction.

14. The computer program product of claim 8, wherein the program code instructions to provide for presentation of the prioritized list of geo-tagged events comprise program code instructions to provide for presentation of the prioritized list of geo-tagged events proximate a map, and wherein a location of each the geo-tagged events of the prioritized list of geo-tagged events is identified on the map.

15. A method comprising:
  determining a first map-matched location, wherein the first map matched location corresponds to a current location of a vehicle;
  determining a plurality of additional map-matched locations wherein a subset of the plurality of additional map matched locations are each associated with a geo-tagged event;
  determining a plurality of road segments emanating from or leading to the first map-matched location, a portion of which connect between the first map-matched location and the plurality of additional map-matched locations;

calculating at least one of a weight or a turn probability for turning onto a road segment for each road segment of the plurality of road segments emanating from or leading to the first map-matched location, a portion of which connect between the first map-matched location and the second map-matched location;

determining, from the weight or the turn probability associated with each road segment of the portion of road segments that connect between the first map-matched location and the plurality of additional map-matched locations, a probability of a path taken between the first map-matched location and each of the geo-tagged events, the path comprising a plurality of road segments;

generating a list of the geo-tagged events prioritized according to a probability associated with the path to reach each of the respective geo-tagged events; and providing for presentation of the prioritized list of geo-tagged events.

16. The method of claim 15, wherein determining the first map-matched location comprises determining the first map-matched location and a direction of travel of the vehicle.

17. The method of claim 16, wherein calculating a weight for each road segment comprises calculating a weight for each road segment based, at least in part, on the direction of travel.

18. The method of claim 15, wherein calculating a weight or turn probability for turning onto a road segment for each road segment of the plurality of road segments emanating from or leading to the first map-matched location comprises:
determining one or more turn probabilities between the first map-matched location and a respective road segment; and
calculating a weight for each respective road segment based, at least in part, on the turn probabilities between the first map-matched location and the respective road segment.

19. The method of claim 15, wherein each geo-tagged event comprises an event type and an event location, and wherein the event type comprises at least one of a: traffic accident, disabled vehicle, road closure, or construction.

20. The method of claim 15, wherein providing for presentation of the prioritized list of geo-tagged events comprises providing for presentation of the prioritized list of geo-tagged events proximate a map, and wherein a location of each the geo-tagged events of the prioritized list of geo-tagged events is identified on the map.

21. A map services provider system comprising:
a communications interface configured to receive a first location and a plurality of additional locations, and at least one processor configured to:
map-match the first location to a first map-matched location, wherein the first map matched location corresponds to a current location of a vehicle;
map-match the plurality of additional locations to respective map-matched locations;
determine a plurality of road segments emanating from or leading to the first map-matched location, a portion of which connect between the first map-matched location and the plurality of additional map-matched locations;
calculate at least one of a weight or a turn probability for turning onto a road segment for each road segment of the plurality of road segments emanating from or leading to the first map-matched location, a portion of which connect between the first map-matched location and the second map-matched location;
determine, from the weight or the turn probability associated with each road segment of the portion of road segments that connect between the first map-matched location and the plurality of additional map-matched locations, a probability of a path taken between the first map-matched location and each of the geo-tagged events, the path comprising a plurality of road segments;
generate a list of the geo-tagged events prioritized according to a probability associated with the path to reach each of the respective geo-tagged events; and
provide for presentation of the prioritized list of geo-tagged events.

22. The map services provider system of claim 21, wherein the processor configured to determine the first map-matched location is further configured to determine the first map-matched location and a direction of travel of the vehicle.

23. The map services provider system of claim 22, wherein the processor configured to calculate a weight or a turn probability for turning onto a road segment for each road segment may further be configured to calculate a weight or a turn probability for each road segment based, at least in part, on the direction of travel.

24. The map services provider system of claim 21, wherein the processor configured to calculate a weight or a turn probability for turning onto a road segment for each road segment of the plurality of road segments emanating from or leading to the first map-matched location is further configured to:
determine one or more turn probabilities between the first map-matched location and a respective road segment; and
calculate a weight for each respective road segment based, at least in part, on the turn probabilities between the first map-matched location and the respective road segment.

25. The map services provider system of claim 24, wherein the processor configured to calculate a weight or a turn probability for turning onto a road segment for each road segment of the plurality of road segments emanating from or leading to the first map-matched location is further configured to:
determine one or more recorded trajectories, wherein the one or more recorded trajectories comprises at least one of the plurality of road segments; and
calculate a weight or a turn probability for turning onto a road segment for each road segment of the plurality of road segments emanating from or leading to the first map-matched location based at least in part on the one or more recorded trajectories.

* * * * *